L. F. ADT.
EYEGLASSES.
APPLICATION FILED SEPT. 14, 1910.
991,766.
Patented May 9, 1911.
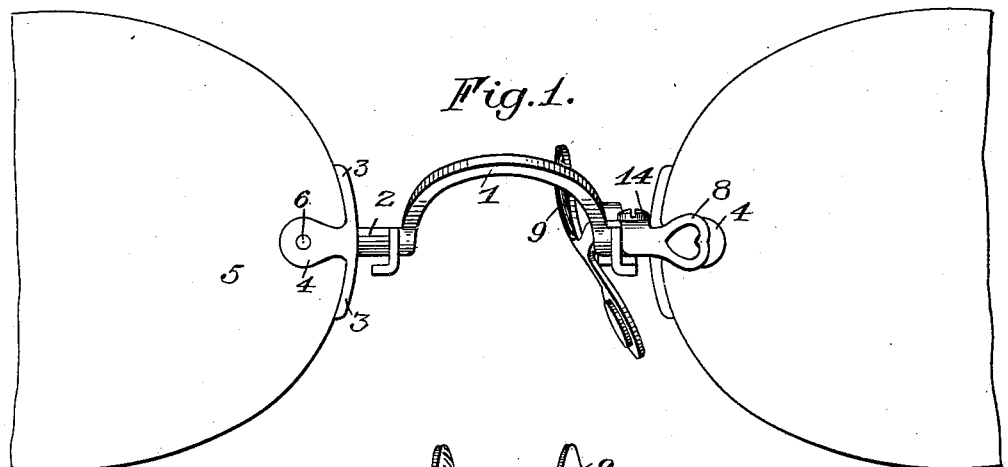
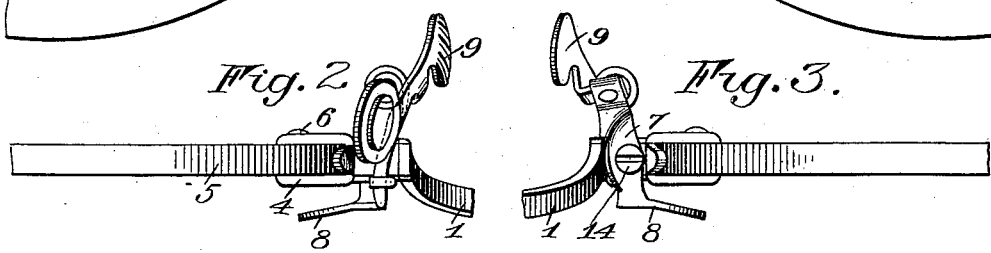
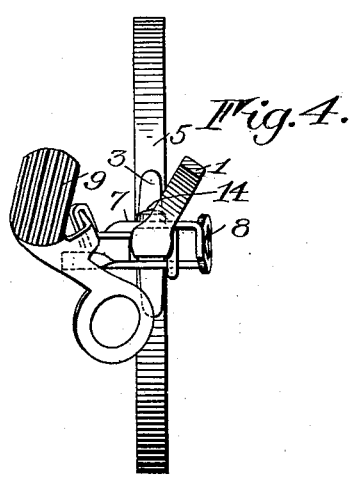
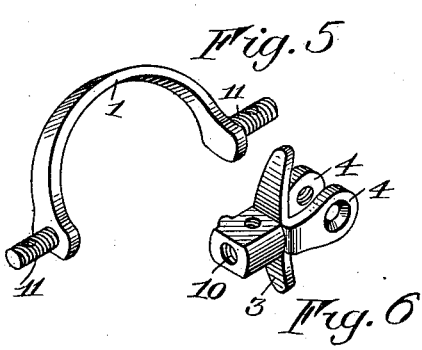
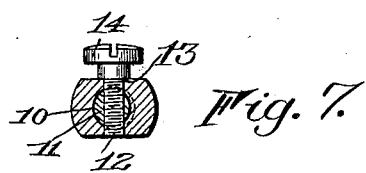
Witnesses
Walter B. Payne.
Russell B. Griffith
Inventor
Leo F. Adt
By Church & Rich
his Attorneys
THE NORRIS PETERS CO., WASHINGTON, D. C.

UNITED STATES PATENT OFFICE.

LEO F. ADT, OF ALBANY, NEW YORK.

EYEGLASSES.

991,766.  Specification of Letters Patent.  Patented May 9, 1911.

Application filed September 14, 1910. Serial No. 581,991.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to optics and more particularly to eyeglasses and it has for its object to provide an eyeglass mounting of the finger piece type embodying features of novelty in the mounting of the guards involved in a simple manner with the employment of removable or interchangeable bridges and in the connection of the bridge itself to the mounting whereby a strong mounting of neat appearance is procured and one capable of being conveniently assembled and manipulated by the optician in fitting the glasses to individuals.

To these and other ends the invention consists in certain improvements and combinations of parts all as will be hereinafter more fully described, the novel features being pointed out in the claims at the end of the specification.

In the drawings: Figure 1 is a front elevation of an eyeglass constructed in accordance with and illustrating one embodiment of my invention; Fig. 2 is a bottom plan view of one half of the eyeglass; Fig. 3 is a top plan view thereof; Fig. 4 is a central vertical section taken transversely through the bridge; Fig. 5 is a detail perspective of the bridging portion; Fig. 6 is a similar view of the lens attaching portion, and Fig. 7 is a vertical section through the lens attaching portion and bridge connection in the plane of the pivot of the guard.

Similar reference numerals throughout the several figures indicate the same parts.

As the noses of different wearers have different characteristics it is desirable to have the bridging portion of an eyeglass removable or interchangeable in order that bridges varying in length or shape or differently formed may be substituted for each other in an otherwise standard mounting for particular cases and an eyeglass embodying this feature is herein shown to comprise an arched bridging portion 1, a lens attaching portion 2, the latter having the lens engaging ears 3 and the lugs 4 for securing it to the lenses 5 with a connection 6, and pivoted nose guards 7 embodying forwardly arranged finger portions 8 and nose engaging pads 9 at the rear.

In the practice of the present invention I make arrangements whereby the bridging portion interlocks with the lens attaching portion and the mounting of the guard serves to hold these parts in their interlocked relation. For this purpose each lens attaching portion has a central circular recess 10 extending horizontally outwardly toward the lens in the plane thereof and threaded, in the present instance, to receive a threaded part 11 connecting the lens attaching portion with the bridging portion which part is preferably formed integrally with the latter as an outward extension at its end. By this means, the two parts are interlocked by a relative rotary movement.

The guard 7 turns on the lens attaching portion about a pivot pin or fastener 12 extending through the lens attaching portion and provided with a shoulder 13 spacing its projecting end from the latter to form a bearing beneath its headed portion 14. The fastener is threaded in the present instance and passes transversely through the connecting part 11 on the bridge in the plane thereof when the same is screwed into the lens attaching portion. Thus the bridge cannot be detached from or change its position with relation to the lens attaching portion without removing the pivot fastener 12 of the guard.

It is preferable to form the hole for the fastener after the bridge and lens attaching portion have been interlocked and screwed up tightly together but with the substitution of another bridge on which the threads have not been started in the same relation to the arch so that the lenses would be out of proper alinement and not in the same plane were the connection 11 screwed in as far as possible, the fastener 12 would still form a means of preserving the proper relationships and prevent relative movement of the bridge and the rest of the mounting in either direction.

The connecting part 11 is, of course, of greater diameter than the fastener 12 but its bearing in the lens attaching portion is extensive reducing any chance of the threads becoming stripped or mutilated and insuring a strong joint between the bridge and the rest of the mounting.

I claim as my invention:

1. In an eyeglass mounting, the combination with a lens attaching portion and a bridging portion, of a part for connecting said members together threaded into one of them, a fastener coöperating with said part to lock it in position and a nose guard turning on the fastener.

2. In an eyeglass mounting, the combination with a lens attaching portion and a bridging portion, of an extension on one of said members adapted to interlock with the other by a relative rotary movement of the members, a fastener coöperating with said extension to hold it in such interlocked position and a nose guard turning on the fastener.

3. In an eyeglass mounting, the combination with a lens attaching portion and a bridging portion, of a part connecting said members together adapted to interlock with one of them by a rotary movement relatively thereto, a fastener coöperating with said part to hold it in such interlocked position and a nose guard turning on the fastener.

4. In an eyeglass mounting, the combination with a bridging portion and a lens attaching portion, of a part connecting them together and having a relative rotary engagement with one of them, a fastener for locking said part against such relative rotary motion and a nose guard turning on the fastener.

5. In an eyeglass mounting, the combination with a lens attaching portion and a bridging portion, one of said parts having an extension threaded into the other, of a pivot on said last mentioned part extending transversely through the extension and a nose guard turning on the pivot.

6. In an eyeglass mounting, the combination with a lens attaching portion and a bridging portion provided with a horizontal lateral extension threaded into the bridging portion, of a nose guard, and a pivot therefor carried by the lens attaching portion and extending transversely through the extension of the bridge to lock the latter against turning movement.

7. In an eyeglass mounting, the combination with a lens attaching portion and a bridging portion separate therefrom, of a part forming a means of connection between said members and extending horizontally into the lens attaching portion, a pivot on the lens attaching portion extending transversely of the connecting part in the same plane therewith and a nose guard turning on the pivot.

LEO F. ADT.

Witnesses:
JOHN W. MORRIS,
E. P. YORK.

---

Copies of this patent may be obtained for five cents each, by addressing the "Commissioner of Patents, Washington, D. C."

DISCLAIMER.

991,766.—*Leo F. Adt*, Albany, N. Y. EYEGLASSES. Patent dated May 9, 1911.
Disclaimer filed July 3, 1915, by the patentee.

Enters this disclaimer—

"To that part of the claim in said specification which is in the following words, to wit:

"7. In an eyeglass mounting, the combination with a lens attaching portion and a bridging portion separate therefrom, of a part forming a means of connection between said members and extending horizontally into the lens attaching portion, a pivot on the lens attaching portion extending transversely of the connecting part in the same plane therewith and a nose guard turning on the pivot."

[*Official Gazette, July 13, 1915.*]